(12) United States Patent
Tow et al.

(10) Patent No.: US 7,266,771 B1
(45) Date of Patent: Sep. 4, 2007

(54) VIDEO STREAM REPRESENTATION AND NAVIGATION USING INHERENT DATA

(75) Inventors: Robert F. Tow, Los Gatos, CA (US); Ali Rahimi, Cambridge, MA (US); Steven E. Saunders, Cupertino, CA (US); Don B. Charnley, Half Moon Bay, CA (US); Gordon Kotik, Palo Alto, CA (US)

(73) Assignee: Vulcan Patents LLC, Seattle, WA (US)

( * ) Notice: Subject to any disclaimer, the term of this patent is extended or adjusted under 35 U.S.C. 154(b) by 513 days.

(21) Appl. No.: 09/841,687

(22) Filed: Apr. 23, 2001

Related U.S. Application Data

(60) Provisional application No. 60/198,895, filed on Apr. 21, 2000.

(51) Int. Cl.
*G06F 3/00* (2006.01)
*G06F 9/00* (2006.01)
*G06F 17/00* (2006.01)
(52) U.S. Cl. ................. 715/719; 715/722; 375/240.02; 345/699; 386/46
(58) Field of Classification Search ................. 345/723; 348/722, 192, 699–701; 709/236; 375/240.02, 375/240, 204.16, 240.17; 382/232; 714/746
See application file for complete search history.

(56) References Cited

U.S. PATENT DOCUMENTS

| | | | | |
|---|---|---|---|---|
| 5,109,482 A | * | 4/1992 | Bohrman | 345/723 |
| 5,473,379 A | * | 12/1995 | Horne | 375/240.16 |
| 5,805,156 A | * | 9/1998 | Richmond et al. | 345/723 |
| 6,041,142 A | * | 3/2000 | Rao et al. | 382/232 |
| 6,072,542 A | * | 6/2000 | Wilcox et al. | 348/722 |
| 6,081,551 A | * | 6/2000 | Etoh | 375/240 |
| 6,141,693 A | * | 10/2000 | Perlman et al. | 709/236 |
| 6,212,657 B1 | * | 4/2001 | Wang et al. | 714/746 |
| 6,297,845 B1 | * | 10/2001 | Kuhn et al. | 348/192 |
| 6,452,969 B1 | * | 9/2002 | Yim | 375/240.02 |

\* cited by examiner

*Primary Examiner*—Kristine Kincaid
*Assistant Examiner*—Boris Pesin
(74) *Attorney, Agent, or Firm*—Perkins Coie LLP

(57) ABSTRACT

An MPEG compressed bit stream representing video information is associated with supplemental information such as motion, audio, scene cut, and editorial information. The motion information is identified and processed to determine characteristics of the video information. Motion information is processed to determine magnitude, coherence, and correlation with known motion information templates. MPEG motion vectors are used to determine motion information. Audio, scene cut, and editorial information is similarly identified and processed. The motion information along with other types of information is provided to a client by using color bars or other techniques to allow a client to interact with the video information using supplemental information.

45 Claims, 13 Drawing Sheets

Figure 1B
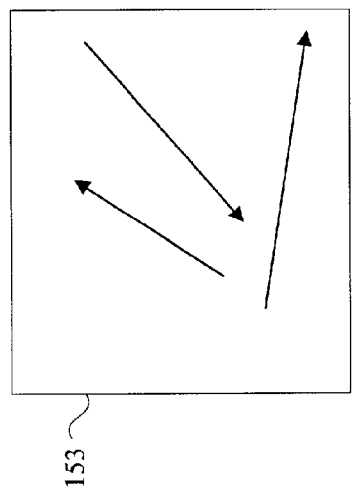
153
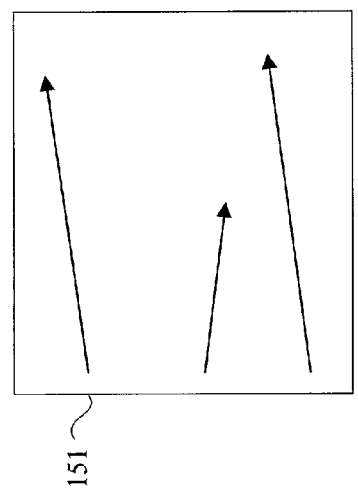 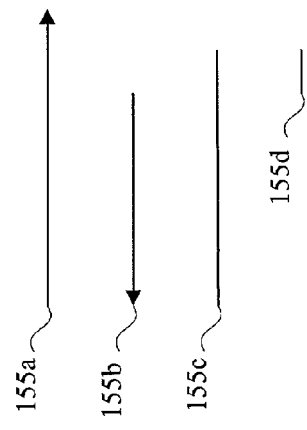
151
155a
155b
155c
155d

VIDEO STREAM REPRESENTATION AND NAVIGATION USING INHERENT DATA

This application claims priority under U.S.C. 119(e) from U.S. Provisional Application No. 60/198,895, entitled "Video Stream Representation And Navigation Using Inherent Data," as of filing on Apr. 21, 2000, the disclosure of which is herein incorporated by reference for all purposes.

FIELD OF THE INVENTION

The present invention relates generally to analysis of video information. More specifically, the present invention relates to a technique for representing video information visually such that a viewer may navigate through the video information easily.

BACKGROUND OF THE INVENTION

Nowadays, a consumer is presented with an incredible quantity of video information for his or her use. Not only are an enormous number of feature movies available, but also the quantity of channels on a television provide an almost limitless variety of video information to be viewed. Furthermore, the proliferation, miniaturization and low cost of video cameras, along with the ubiquitous Internet, means that even more and more video information can be captured for viewing for wide variety of reasons. Not only is the quantity of video information increasing, but the ease by which a consumer may access video information is also increasing. For example, a consumer at home has access to traditional broadcast television, cable television, satellite television, and perhaps even television over the Internet. Further, a wide variety of set-top boxes and other devices are being marketed that allow consumers the unprecedented ability to interact with video information, to store video information, or to replay video information on their own terms. This increase in video information is not only available to the consumer at home, but is also becoming more available to the office worker on his desktop or to any of a variety of professionals who record and use video information as part of their livelihood.

This tremendous increase in the amount of video information available to a consumer and the ease with which it may be accessed presents certain difficulties for a viewer. It can be difficult to search through or "navigate" such video information if the content is extremely long, or there are a variety of chose from.

For example, the usual way that most viewers navigate through a movie is to use fast forward or rewind such that the frames flash by in quick succession. Even if the movie has been stored on a hard drive connected to a monitor, fast forward or rewind is still used; there is no reliable technique for identifying particular portions of the movie based upon its contents. A similar problem exists with surveillance videos made by a consumer or by a professional in that the contents need to be analyzed to detect certain activities. Consider a home surveillance video left on over the weekend, a consumer would have to fast forward through the entire forty-eight hours or more in order to detect if any untoward activities had occurred and been captured by the video. Once solution used is to trigger a video camera with a motion detector so that the camera is only on when motion occurs. This technique cannot differentiate between types or motion and still may result in hours and hours of video information that needs to be viewed.

In another situation, consider a channel guide being presented to a viewer on a home television. The channel guide list channels, the names of movies, and a brief narrative for each. For the viewer, however, there is no easy and reliable technique to determine the content of the movie, the type of action it contains, the amount of violence, or where certain types of content might occur in the movie.

Similarly a viewer looking at a channel guide who would like to watch a movie that has a particular tone, certain types of action, or other desirable characteristics, is not able to simply and reliably initiate a search for that type of movie either on his own hard disk, or through the selection of movies presented by a context supplier (such as broadcast, cable or satellite).

Another problem with the proliferation of video information available in the home is the increase in the amount of undesirable sex and violence in certain shows and its effect on young children. Often, parents desire to restrict access to certain shows based upon their rating. Unfortunately, though, rating standards are not uniform between home television programs and movies in commercial theaters, and may differ slightly depending upon a geographic region or upon the network supplying the programming. Further, these rating standards always seem to be changing and it can be difficult for the average consumer to keep up with the different rating standards and their meanings. Often, an otherwise excellent movie that is suitable for children may be restricted from their viewing because one or two scenes contain offensive material. A technique would be desirable to assist viewers with the interpretation of ratings for video information and to allow movies to be watched more easily by a wider audience with safeguards in place.

A variety of prior art techniques have been suggested to deal with the navigation of video information but are not optimal. For example, it is known to produce a slider bar at the bottom of a movie being shown to allow a viewer to quickly select and move to any point within the movie. This bar, however, presents no information to viewer other than an indication of a chronological point in the movie where the view can go. Very small renditions or thumbnails of scenes as well as vertical lines representing scene breaks have also been used.

In one experiment, researchers from MIT made video "solids" where you could see the edge pixels of a video stream. Thus, one can view an actual three-dimensional solid that represented each image from the video being stacked next to one another. Although interesting from a research point of view, the video solid did not greatly assist a viewer in navigating through a video stream.

In another area somewhat related to the navigation of video information, consumers are also being bombarded with a great number of books for reading. Although a reader is generally apprised of the content of the book by reading the flyleaf, there is no simple technique for determining the tone of a book, its emotional content or the type of action it contains aside from actually flipping through the book and reading various pages.

Giving the above difficulties with the proliferation of video information and determination of its contents, systems and techniques are desirable that would allow a viewer to quickly and easily navigate video information.

SUMMARY OF THE INVENTION

To achieve the foregoing, and in accordance with the purpose of the present invention, a technique for representing the content of video information is disclosed that allows a human viewer to quickly and easily determine a type of content and its location within the video information.

In one embodiment, the motion energy of a stream of video information is represented graphically or in a color bar that the human eye can view and pick out easily. When presented in a color navigation bar, different portions of the video information are represented by a different color according to the particular content of the video information. For example, the HLS (hue, lightness and saturation) color space may be used to represent the particular motion energy of the video information in a navigation bar located at the bottom of the video being played. In one example, a shade of red could indicate large magnitude coherent motion, pink could represent incoherent motion and a shade of blue could represent small magnitude motion. By scanning the color bar visually and moving a cursor with a remote control, a viewer may identify that portion of the video he or she desires based upon the motion energy and select that portion to be watched.

In a preferred embodiment, the motion vectors that are included in an MPEG file are used to help determine the type of motion energy in a particular frame or frames of a video. Although the present invention will be described in the context of MPEG, it will be appreciated by one of skill in the art that other compression methods may also provide motion information that can be used to implement the present invention. Traditionally, motion vectors in an MPEG file have been used to assist in the compression and decompression of video by indicating movement of pixels from frame to frame. Advantageously, the present invention realizes that such a motion vector may be used for entirely different purposes, and makes use of these motion vectors to indicate a type of motion energy at a particular place in the video information which is then presented to a viewer in a graphically intuitive manner.

The presentation to the viewer may take the form of a color navigation bar may be presented in a single color graph where the magnitude of the graph indicates the amount of motion energy, or may be presented in other graphical forms.

Not only can gross motion energy and types of motion energy be represented in a graphical form for the viewer but also other inherent information of the video such as gross scene changes and scene breaks, audio amplitude, audio frequency bands, audio stereo balance and movement can be represented.

Thus, a viewer watching a videotape at home on a television, may quickly view and understand the color navigation bar presented at the bottom of the screen and choose a location within the video to watch. Alternatively, the navigation bar presented at the bottom of the screen can represent another video or show that is in progress, and when a particular point is reached, the viewer can switch to the different show. Other applications include reviewing home surveillance videos. A viewer trying to analyze a weekends worth of home surveillance videotapes can review the navigation bar at the bottom of the screen to find particular types of motion energy that indicate action caught by the video. Thus, the viewer is able to quickly and easily jump to that location in the video where something may be occurring.

In a variation on this embodiment, any number of navigation bars for different videos are presented in a channel guide shown on a television screen to present the viewer with a choice of programs. Similar to a traditional channel guide, this embodiment includes the name of the show, its channel, perhaps a brief description and also a visual navigation bar that presents in an intuitive form statistics based upon the content of the video. As previously mentioned, these statistics may be represented by colors, and can indicate the type, amount, or qualities of motion energy and/or audio. By viewing the channel guide and its presentation of various visual navigation bars, a viewer is easily able to make an informed choice about which program to watch.

In a second embodiment of the invention, audio information from a video is extracted and displayed visually for a viewer to assist with navigation of the video. In one embodiment, audio amplitude (volume) is plotted versus time in a graph. In another embodiment, audio information from an MPEG file are used to determine the audio content of frames and scenes throughout the video. As above, a color navigation bar may be created from these audio vectors to represent the audio content of the video. Hue, saturation, lightness, etc. may be used to represent volume, tone, number of voices, etc. Alternatively, audio information from an audio-only source (such as radio, movie soundtrack, compact disk, etc.) can be used as input to produce a visual display for a listener.

Additionally, information derived from both motion and audio may be combined together in a visual display, for example, using color saturation to represent audio intensity and using color value (e.g., red, blue, etc) to represent motion energy coherence, and using brightness to represent motion energy magnitude. A variety of such combinations are readily apparent to one of skill in the art.

In a third embodiment, any video information can be viewed by a professional who adds editorial information to the video. For example, editorial information such as tone, emotion, level of violence, or a wide variety of other signified meta-data or editorial content may be presented. The information may include the number of people in a scene, language content, an "adult" rating, and place information. The information can be annotated to the video and then presented to the user in a navigation bar. All of these types of statistics from the video stream are added as annotations to the video file for later analysis by the viewer looking at a navigation bar. Advantageously, the annotations are transparent, take up a very few number of bytes, and are readable by the device rendering the video to the viewer. Further, those devices that do not recognize the annotations added to the video file can simply disregard the annotations without affecting presentation of the video. As an extension of this embodiment, movie rating information is annotated to each frame or scene in a video. In this embodiment, a rating is added to the video file for later presentation to a viewer. In this way a viewer can view a navigation bar and determine which type of scenes occur at different places in the video.

In a fourth embodiment, a playback device is enabled to detect this editorial information or rating information and skip over or delete certain scenes or frames that have particular information or a rating. For example, a parent could program the system to play an R rated movie yet skip over all of the scenes that are R rated so that a PG movie is created for viewing by children.

In a fifth embodiment that makes use of choice a channel guide, a viewer is able to search through a selection of videos by analyzing their navigation bars. For example, using a remote with a television screen, a viewer may initiate a search for a show that has little motion occurring within it and thus a low level of violence. The viewer performs this search by selecting particular colors that represent little motion and a low level of violence. The system in this embodiment then performs a search of any number of navigation bars (that represent various videos) for a bar that contains the content that the viewer desires. Once a selection of such bars are found, these found bars are presented to the viewer in a channel guide. The viewer may then review the movie titles, perhaps a brief narrative, and the visual navigation bar for each movie that in more detail shows visually the content of the video. In this fashion, a viewer is able to quickly and easily select a video for viewing based upon a particular type of desired content.

In a sixth embodiment of the invention, the motion vectors from an MPEG file are analyzed to determine where a scene cut occurs in a video. Once determined, this scene information is presented in a visual navigation bar as a particular color or line, or may be presented in a single color graph.

In a seventh embodiment of the invention, an indication of the content of a book is displayed using a color navigation bar; the color bar is presented along the edge of the pages of the book. In this way, a reader can simply pick up a book and by looking at the edge of the pages, determine the content of the book such as the type of action occurring, the emotion in a book, its tone, or other editorially added information. The color bar may be printed directly onto the outside edges of the pages of the book, or may be printed onto each page as the text is being printed. When printed in a small area adjacent to the edge of the page, the color bleeds through and is visible when viewing the page from its edge.

BRIEF DESCRIPTION OF THE DRAWINGS

The invention, together with further advantages thereof, may best be understood by reference to the following description taken in conjunction with the accompanying drawings in which:

FIG. 1B is a diagrammatic representation of types of inherent motion data.

DETAILED DESCRIPTION OF THE INVENTION

Introduction

Figure 1A:
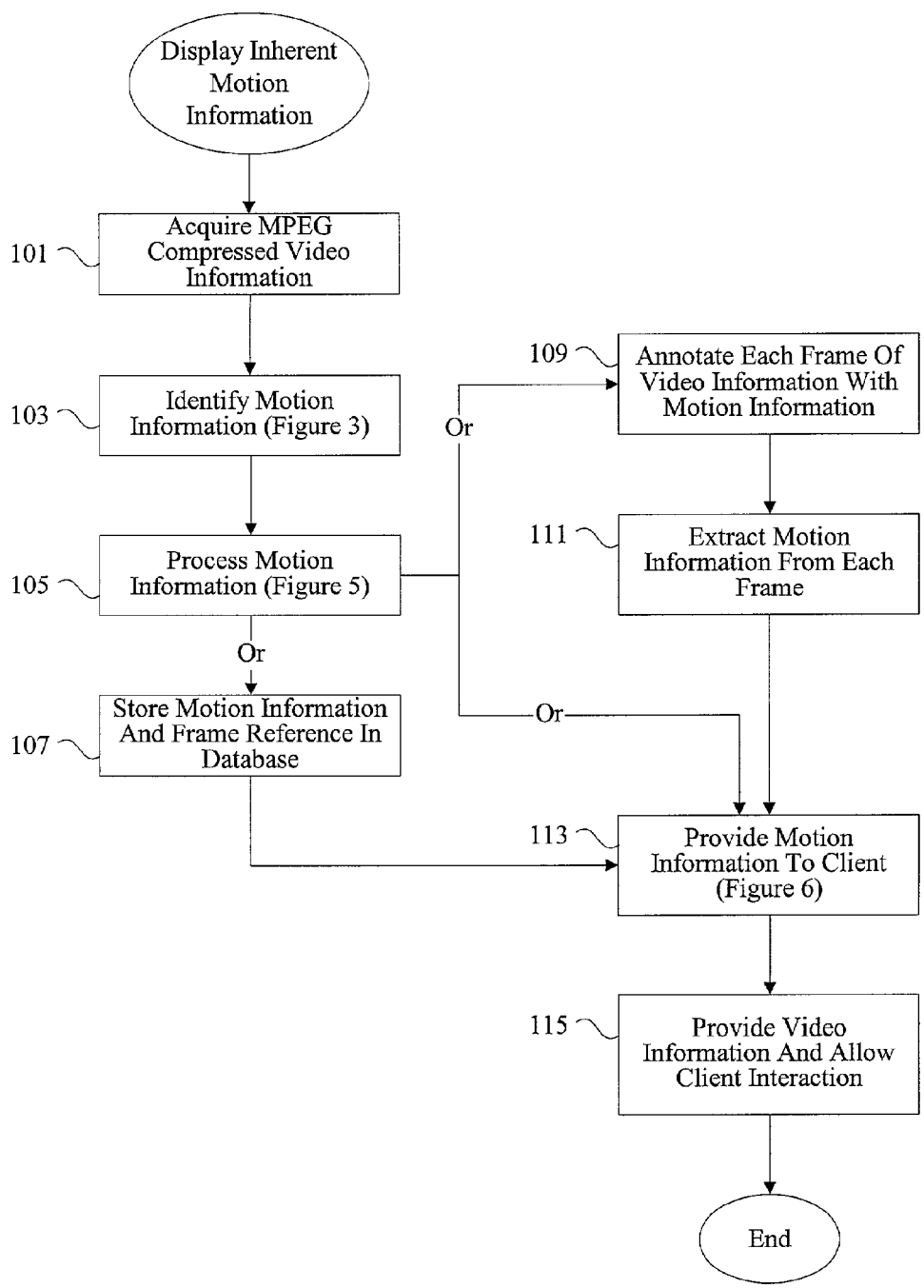
FIG. 1A is a flow diagram depicting techniques for displaying inherent motion data.

The present invention generally relates to providing a client with supplemental information inherent in a video stream. Supplemental information includes motion, audio, scene cut, and editorial information. Generally, information associated with an MPEG video bit stream that is not the video information itself is referred to as supplemental information. One type of supplemental information that a client may be interested in is motion information. MPEG compression characteristics provide a convenient technique for providing motion information to a client. MPEG video and image compression techniques are described generally in *Image and Video Compression Standards Algorithms and Architectures*, by Vasudev Bhaskaran and Konstantinos Konstantinides (ISBN: 0792399528), the entirety of which is hereby incorporated by reference for all purposes.

MPEG digital video compression schemes allow digitized video frames to be represented digitally in an efficient manner. Compression of digital video makes it practical to transmit the compressed signal by digital channels at a fraction of the bandwidth required to transmit the original signal without compression. International standards have been created on video compression schemes. The standards include MPEG-1, MPEG-2, MPEG-4, H.261, H.262, H.263, H.263+, etc. The standardized compression schemes mostly rely on several key algorithm schemes: motion compensated transform coding (for example, DCT transforms or wavelet/sub-band transforms), quantization of the transform coefficients, and variable length encoding (VLC).

The motion compensated encoding removes the temporally redundant information inherent in video sequences. The transform coding enables orthogonal spatial frequency representation of spatial domain video signals. Quantization of the transformed coefficients reduces the number of levels required to represent a given digitized video sample and reduces bit usage in the compression output stream. The other factor contributing to the compression is the use of variable length coding (VLC) so that most frequently used symbols are represented by the shortest code word. In general, the number of bits used to represent a given image determines the quality of the decoded picture. The more bits used to represent a given image, the better the image quality. The system that is used to compress digitized video sequence using the above described schemes is called an encoder or encoding system.

More specifically, motion compensation performs differential encoding of frames. Certain frames, such as I-frames in MPEG-2, continue to store the entire image, and are independent of other frames. Differential frames, such as B-frames or P-frames in MPEG-2, store motion vectors associated with the difference and coordinates of particular objects in the frames. The difference between frame portions can be represented by motion vectors. In MPEG-2, P-frames reference a single frame while B-frames reference two different frames. Motion compensation allows fairly high reduction ratios by carrying motion information in an MPEG stream instead of explicit video information. That is, motion information instead of image information is retained.

Capture and Display of Inherent Motion Information

Figure 3:
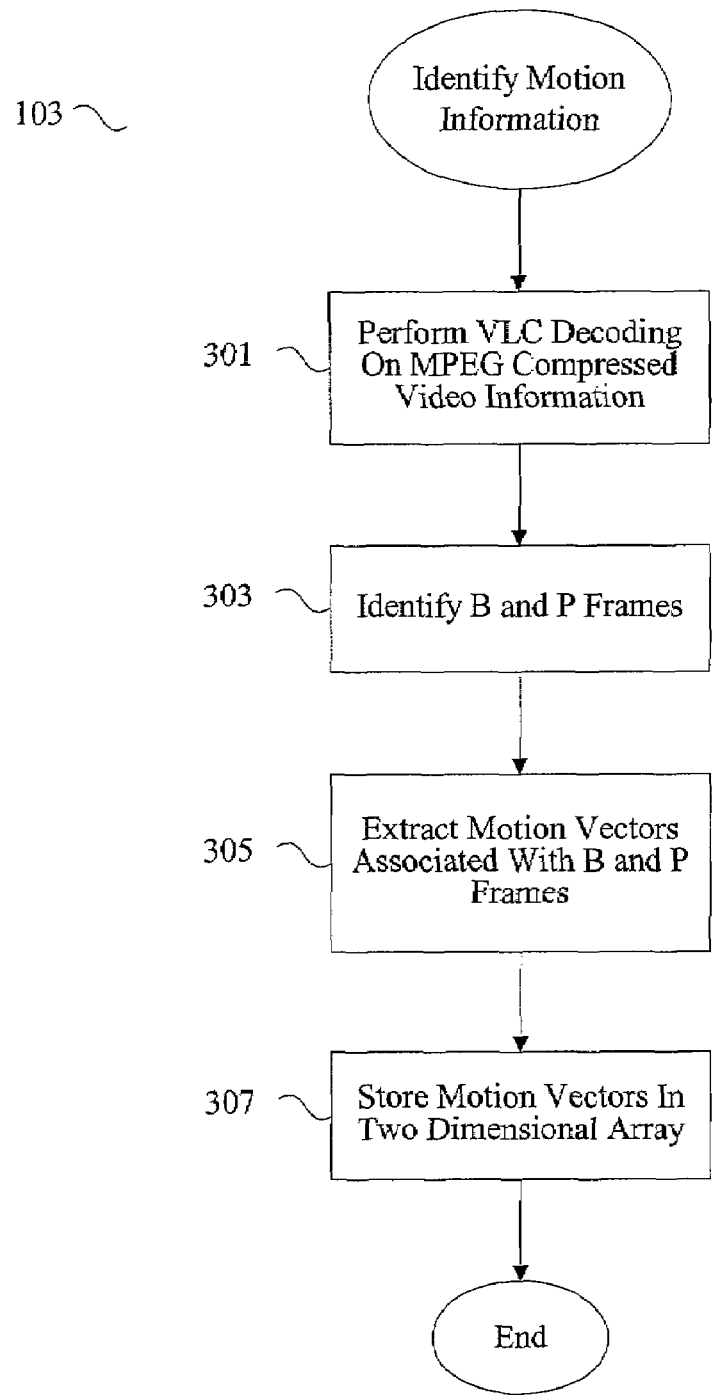
FIG. 3 is a process flow diagram providing information on the identification of motion information in an MPEG video stream.
Figure 5:
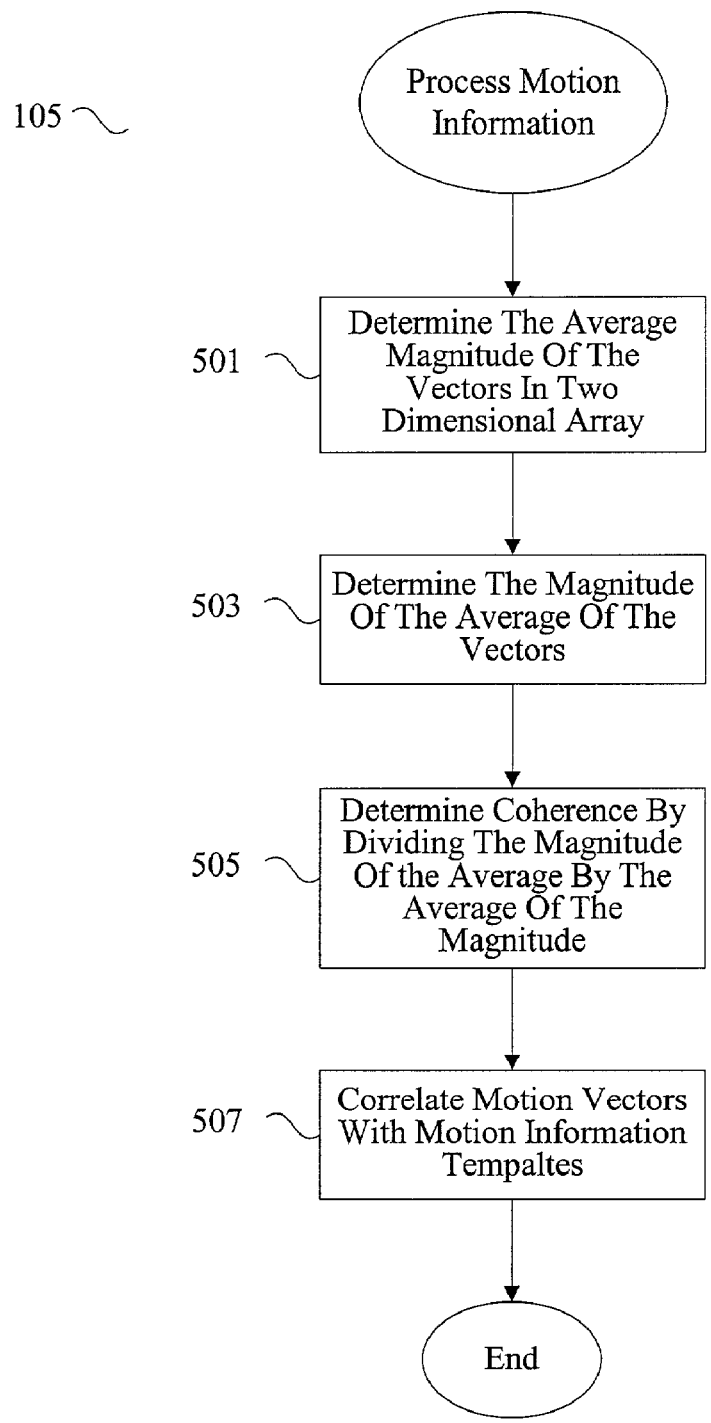
FIG. 5 is a process flow diagram providing more detail on processing the motion information.

FIG. 1A is a process flow diagram showing a technique for displaying inherent motion information in an MPEG bit stream according to a first embodiment. Advantageously, this embodiment uses inherent motion information from the bit stream for conveying motion to a user. At 101, MPEG compressed video information is acquired. MPEG compressed video information is typically conveyed in the form of a bit stream. As noted above, the MPEG compressed bit stream comprises images frames as well as motion frames. As will be appreciated by one of skill in the art, motion information can be identified at 103. FIG. 3 describes a technique for identifying motion information. Identifying motion information includes determining locations of P-frames and B-frames in an MPEG bit stream and finding the motion vectors associated with the P-frames in the B-frames. At 105, the motion information including motion vectors is processed to determine characteristics associated with the video information. FIG. 5 provides a technique for processing motion information.

A variety of characteristics associated with the video information can be determined by processing the motion information. For example, motion information associated with the frame can indicate large, uniform movement towards the left of the frame. Large, uniform movement towards the left of the frame may indicate that the video information is showing an army marching towards the left of frame. Alternatively, motion information associated with the frame can indicate random movement. For example, random movement can indicate soldiers fighting in a battlefield.

FIG. 1B is a diagrammatic representation showing motion vectors. Frame 151 shows coherent motion, with motion vectors generally oriented in the same direction. Frame 153 shows incoherent motion, with motion vectors not generally oriented in one particular direction. Vectors 155*a-d* will be described below.

By analyzing motion information to determine characteristics associated with the video information, computationally expensive MPEG decoding can be avoided. As will be appreciated by one of skill in the art, motion information can be extracted from an MPEG video stream without decoding the entire MPEG video stream. For example, I-frames containing the image information do not need to be decoded. Using motion information to provide characteristics of the video information to a client allows inexpensive analysis of an MPEG bit stream.

After the motion information is processed at 105 to determine characteristics associated with the video information, several options are available. One option is that the processed motion information can be provided to a client at 113. Alternatively, the motion information and associated frame references can be stored in a database. According to various embodiments, motion vectors and associated frame numbers of a particular MPEG video bit stream can be stored for later retrieval. Each frame of MPEG compressed video can also be annotated with motion information at 109. That is, each P-frame and B-frame can be annotated. For example, in the frame containing motion vectors indicating significant uniform movement towards the left of the frame, the frame can be annotated as movement left all or large group moving left.

Annotation can be performed inline of an MPEG conformant stream, according to the industry standard methods of embedding meta data within the several MPEG encoding schemes. Alternatively, the data can be stored separately from an MPEG stream itself, with a temporal correspondence preserved so as to allow later use both separately from or simultaneously with presentation of the MPEG stream. This separate storage and use can be particularly useful for such purposes as channel guides.

Motion information can later be extracted from the annotated frames at 111. In other words, after the motion information is processed at 105, the motion information can be provided directly to a client, stored, or used to annotate video frames. The processed motion information can be provided to the client along with video information at 115 to allow client interaction. The motion information can be used by a client to select a particular scene of interest in an MPEG compressed bit stream. For example, a client may be interested in watching the scene showing the army marching towards the left of the frame. Instead of fast forwarding or rewinding to find the video frames, the client can examine the motion information to determine what associated video frame contains significant movement left, possibly signifying the scene of the army marching towards the left.

Figure 2:
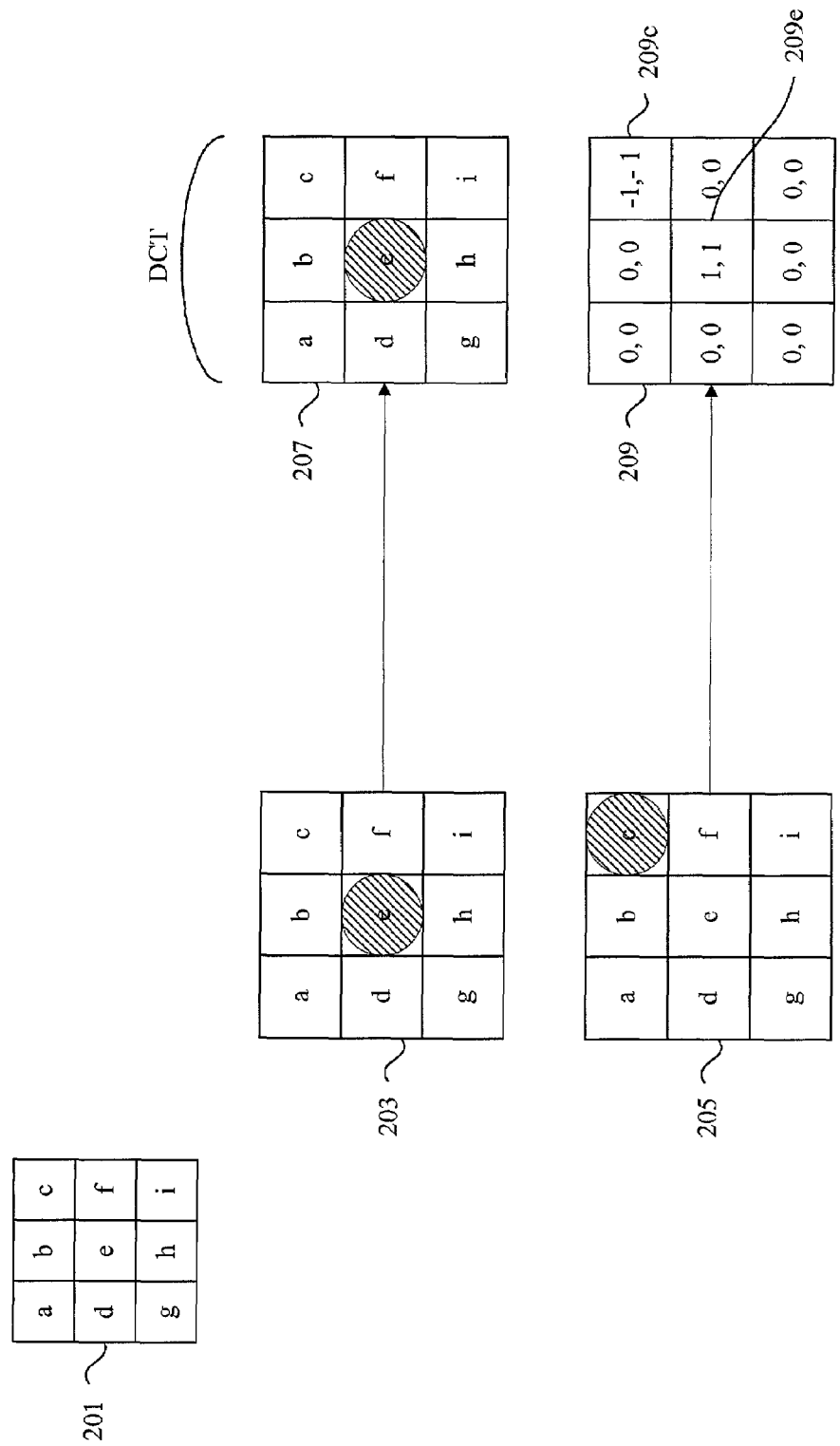
FIG. 2 is a diagrammatic representation showing motion information associated with an MPEG video stream that can be used in the techniques of the present invention.

FIG. 2 is a diagrammatic representation showing motion information associated with an MPEG bit stream that can be processed. A frame of video is shown as frame 201. The frame 201 has blocks 201*a*-201*i*. Each block can represent a number of pixels in an image. For example, a frame having 9 blocks each 10×10 pixels in size would contain 900 pixels and have a resolution of 30×30. FIG. 2 shows two sequential frames of a ball in a video sequence encoded as an image frame and as a differential frame containing motion vectors.

Frames 203 and 205 show video frames that have not yet been MPEG compressed. Frame 203 and frame 205 represent sequential frames in a video sequence. The frame 203 is an image containing a ball in the middle of the frame in block 203*e*. The other blocks in frame 203 contain empty space. The next frame 205 in the video sequence shows that the ball has now moved from the middle of the image to the upper right hand corner of the image to block 205*c*.

The ball has moved from block e to block c in the video frame. Instead of being located in block 205*e*, the ball is now located in block 205*c*. Using motion compensation, frame 203 is encoded as I-frame and frame 205 is encoded as a P-frame. As will be appreciated by one of skill in the art, frame 203 is encoded to resemble a bit stream that can be at decoded to yield frame 207. Frame 205, however, is encoded to resemble a bit stream that can be decoded to yield frame 209. The frame 209 contains motion vectors instead of the image of the ball itself. Frame 209 depends on frame 207. More specifically, block 209*a* contains a motion vector of (0,0). Block 209*a* references block 207*a* and indicates by using motion vector (0,0) that block 209*a* largely corresponds to block 207*a*.

Block 209*c*, however, does not largely correspond to block 207*c*. In fact, block 209*c* should show the ball contained in block 207*e*. Block 209*c* shows the ball of block 207*e* by referencing the previous frame 207. Block 209*c* attempts to find a block in frame 207 that most closely resembles block 209*c*. Block 209*c* finds that block 207*e* most closely matches the ball. Block 209*c* is one block to the right and one block upward from block 207*e*. The relationship can be represented by motion vector (−1,−1). Frame 209 consequently stores a motion vector (−1,−1) and references block 207*e* in block 209*c*. In other words, block 209*c* is the same as block 207*e* except for the (−1,−1) motion vector shift. It will be appreciated that the blocks can be referenced in a variety of manners.

Similarly, block 209*e* now contains empty space where block 207*c* contained a ball. Block 209*e* can reference block 207*c* containing empty space by using motion vector (1,1). The other blocks of frame 209 remain unchanged and do not require motion vectors. A motion vector (0,0) can indicate that the particular block remains unchanged from the prior frame.

It should be recognized that differential relationships between frames can be represented in a variety of manners.

For example, the motion vectors described can be represented in polar coordinates. That is, a (x,y) vector of (1,1) can be represented in polar coordinates as (45 degrees, 1.41), where 1.41 is the magnitude of the vector and the 45 degrees indicates the direction of the vector from the x axis.

The techniques of motion compensation in MPEG use motion vectors to encode differential frames. Typically, there is one reference frame for every 15 differential frames. Using an understanding of MPEG, motion information including motion vectors can be identified.

FIG. 3 is a process flow diagram describing identification of motion information such as in step 103 of FIG. 1. At 301, selected decoding is performed on the MPEG compressed bit stream. As will be appreciated by one of skill in the art, the MPEG compressed bit stream does not need to be fully decoded in order to identify motion information. According to various embodiments, only variable length codes are decoded to acquire motion information. After the variable length codes are decoded, P-frames and B-frames can be identified at 303.

As noted above, P-frames and B-frames contain motion vectors referencing other frames. It should be noted that the motion information may be contained in the MPEG video bit stream or the motion information may be contained in a bit stream associated with an MPEG video bit stream. A particular multimedia stream may include an MPEG video bit stream, an audio bit stream associated with the MPEG video, and a separate bit stream containing motion information. A variety of sources may contain motion information associated with MPEG video frames. The present invention contemplates extracting motion information including motion vectors from a variety of sources. According to various embodiments, motion vectors associated with P-frames and B-frames are extracted at 305. At 307, the motion vectors are then stored in a two dimensional array associated with a particular MPEG frame.

Figure 4:
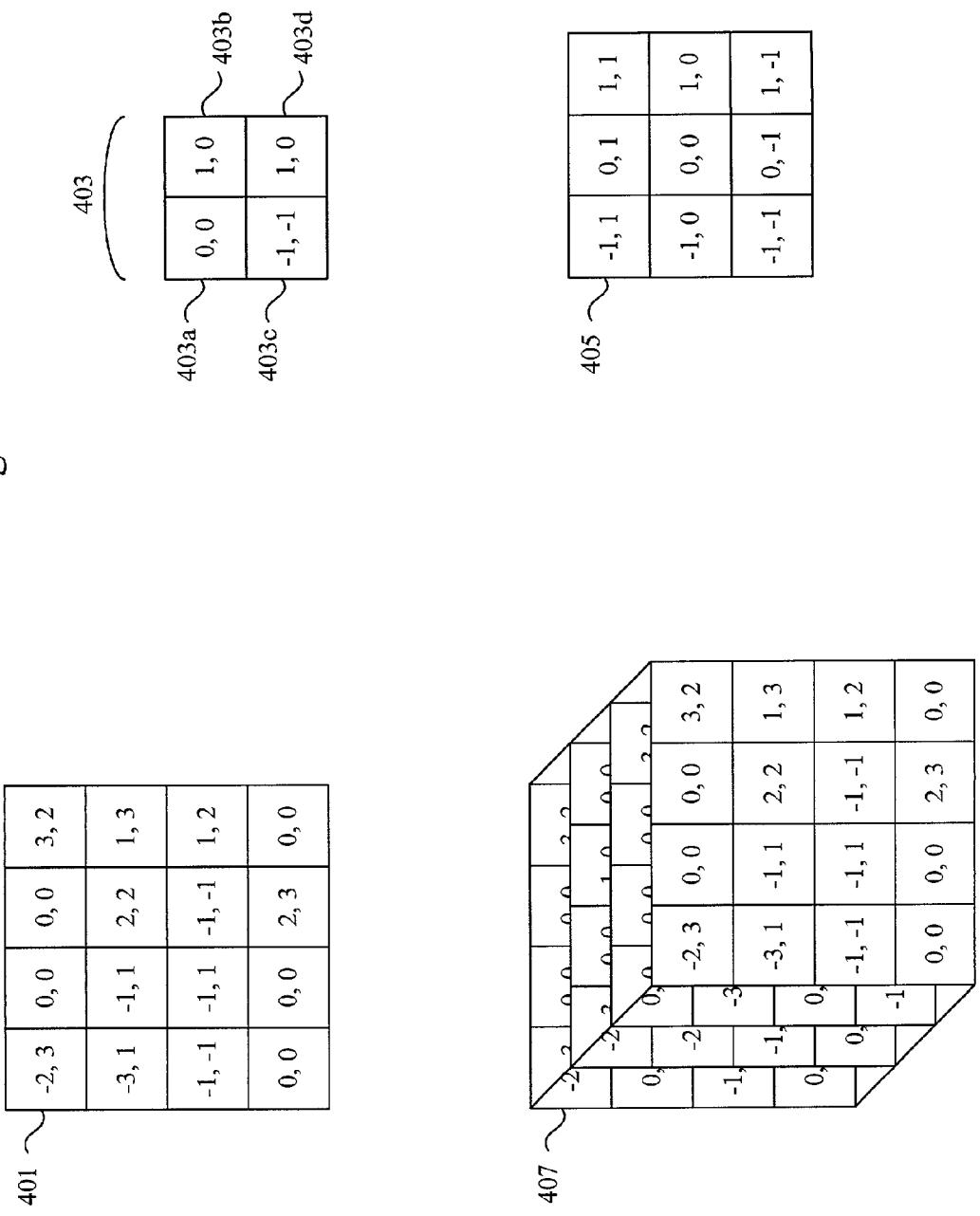
FIG. 4 is one data structure that can be used to maintain motion information in motion vector form.

FIG. 4 is a diagrammatic representation showing one example of a data structure that can be used to store motion information. The data structure is used in the method of FIG. 1 to allow processing of the motion information. The two-dimensional array 401 contains motion vectors associated with each block in an MPEG frame. The entries in the two-dimensional array 401 may contain additional information associated with the motion vector. For example the two-dimensional array 401 may contain motion vectors and their associated reference blocks. In other words, each block can contain a motion vector such as (1,1). Two-dimensional array 403 includes four motion vectors. Two-dimensional array 405 includes nine motion vectors. The two-dimensional arrays can be arranged in time as a three dimension array shown in 407. Each two-dimensional array can represent one frame of video information.

FIG. 5 is a process flow diagram providing detail on processing motion information 105 of FIG. 1. At 501, the average magnitude of the vectors in a two-dimensional array is determined. Using two-dimensional array 403, the average magnitude of the vectors is determined by determining the magnitude of each vector 403a-403d. In this example, the magnitude of each vector 403a-403d is determined to be 0, 1, 1.41, and 1, respectively. The average of the vector magnitudes is 0.85. The average of the vector magnitudes can indicate the amount of motion in a particular frame. A high average magnitude indicates substantial motion in a particular frame, while a zero value indicates no motion a particular frame. For example, vector 155a of FIG. 1B is a vector having higher magnitude than vector 155b. Vector 155c is the average magnitude of the two vectors 155a and 155b.

At 503, the magnitude of the average of the vectors is determined. The magnitude of the average of the vectors determination is different from the average of the magnitude of the vectors determination. Instead of taking the magnitude of the vectors and the averaging the values, the vectors are added first and the magnitude is then taken of the average. For example, vector 155d of FIG. 1B is the magnitude of the average of vectors 155a and 155b. In another example using two-dimensional array 403, the average of the vectors can be determined by summing the vectors 403a-403d and dividing by the number of vectors. In this example, the sum of (0,0), (1,0), (1,0), and (−1,−1) is (1,−1). The average is determined by dividing (1,−1) by 4 to yield (0.25,−25). The magnitude is the square root of the sum of squares, or the square root of $0.25^2+0.25^2$ which is 0.35. The magnitude of the average is useful for determining coherence of motion. That is, the magnitude of the average divided by the average of the magnitude indicates the coherence of the motion vectors in a particular frame. In the present example, 0.35 divided by 0.85 is 0.41, indicating motion information of average coherence. Where the magnitude of the average divided by the average of the magnitude approaches 0, the motion in a particular frame is highly incoherent. That is, motion vectors indicate that movement is occurring in many directions. Where the magnitude of the average divided by the average of the magnitude approaches 1, the motion a particular frame is highly coherent. In other words, the motion vectors indicate that movement is occurring in a particular direction.

In addition to determining the magnitude and coherence of motion vectors in a particular frame, the motion vectors can be compared to motion information templates to determine whether the motion vectors correlate to any known motion pattern. For example motion templates can be constructed with a pattern showing radial motion. Radial motion can be described by having motion vectors in surrounding blocks point outwardly from a center block. One example of a two-dimensional array that can serve as a radial motion template is two-dimensional array 405 of FIG. 4. A center block of two-dimensional array 405 indicates no motion, while the blocks surrounding a center block show motion vectors directed outwardly from the center block.

A variety of motion information templates can be used. For example, motion information templates can be customized to correspond to clapping. Motion information templates showing clapping can include pairs of motion vectors directed towards each other. Motion information templates can be compared to a two-dimensional array of motion information or the templates can be compared to portions of the two-dimensional array of motion information. In other words, the motion information templates showing clapping can be compared to particular portions of a two-dimensional array for a frame showing an audience.

The comparison of motion information templates to a two-dimensional array of motion vectors can be performed using correlation or other statistical techniques. Correlation is used to denote association between quantitative variables. Correlation can be linear, exponential, or logarithmic. According to various embodiments, linear correlation is measured on a scale that varies from +1 to −1. Complete correlation is expressed by either +1 or −1. No correlation is represented by the value of 0. A motion information templates can be correlated to a two-dimensional array for a portion of the two-dimensional array to determine whether the motion vectors in a two-dimensional array match a particular pattern.

Figure 6:
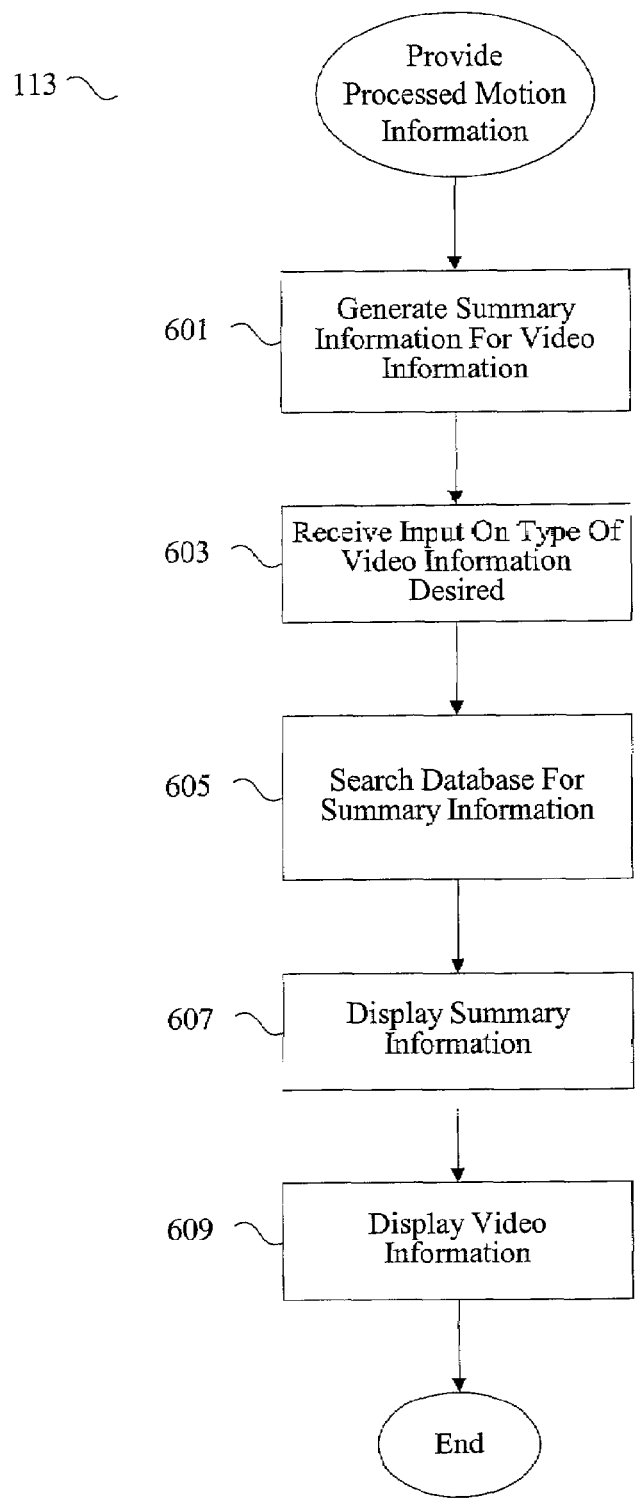
FIG. 6 is a process flow diagram showing techniques for providing processed motion information to a client.

FIG. 6 is a process flow diagram detailing how process motion information is provided to a client, as discussed in process 113 of FIG. 1. At 601, summary information is generated for the video information. The summary information can include motion information that meets a certain set of characteristics. According to various embodiments, summary information can include information about frames that show significant movement towards one particular direction and frames that show radial expansion that may signify explosions. At 603, input is received on what type of video information is desired by a client. A client may wish to only view frames that contain possible explosions. At 605, the database is searched for summary information that matches the client's interests. Summary information containing information about radial expansion can be displayed to the client at 607. The video information associated with the summary information can be provided to the client at 609. FIG. 6 shows techniques for allowing a client to select the type of video information desired. Summary information can be provided as text, numbers, sounds, imagery, or other manners.

Figure 7:
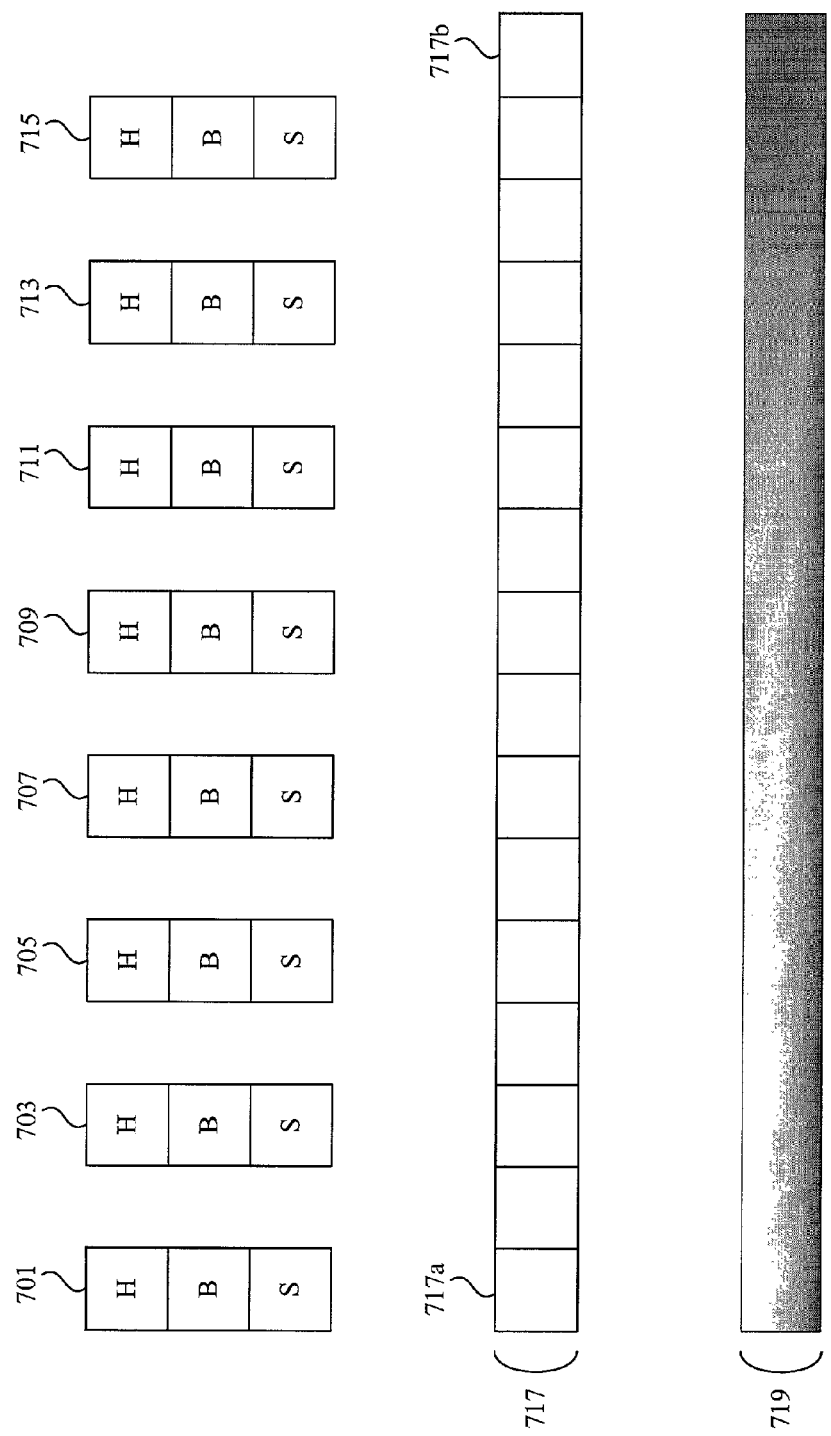
FIG. 7 is a diagrammatic representation depicting one embodiment for providing processed motion information to a client.

According to one embodiment, summary information is provided as color bars. Progressively the color bar displays information for each frame of video as a particular color having different color components. Thus a video appears as a bar of changing color from left to right, each frame represented by a color. Each color may have different components from various color spaces. FIG. 7 shows one example of color bars that can be used to provide summary information to a client. Color bars 701-715 each have hue, brightness, and saturation components. Each component can signify one particular characteristic of the motion information in a frame. For example, hue may be used to signify coherence of motion in a particular frame. Brightness can be used to represent the magnitude of the motion in a frame. A color bar having high brightness for a particular frame can mean that the frame contains motion vectors with significant magnitude.

Saturation components of the various color bars can be used to show whether the frames closely correlate to motion information templates. High correlation can be represented by a color bar with high saturation. It should be noted that the color bars can be varied in other ways to represent additional characteristics associated with motion information in a particular frame. The color bars may vary in height and width depending on correlation with other motion information templates. Color bar 717 is another example of a mechanism for providing summary information. Color bar 717 represents first frame 717a and last frame 717b. Each frame can have various color components. Color bar 719 is a gray scale representation of one example of a color representing motion information in a video sequence.

A typical color navigation bar may be only a few pixels tall, allowing a very compact representation. The representation can be much more compact than an amplitude graph. Navigation bars may be singly displayed beneath a display or edit window, or multiply stacked within a display, such as a channel guide. Many color schemes or mappings are possible. A particularly advantageous color space is that of Hue-Lightness-Saturation (HLS), or the very similar Hue-Lightness-Value, where "hue" corresponds to the common idea of "color shade" (e.g., redness, blueness, greenness, etc), "lightness" is the degree of light or dark (brightness), and "saturation" (or "value") is the degree of color purity (pastelness, as it were). It is readily apparent to one skilled in the art that it is straightforward to transform HLS or HVS to the standard RGB triplets used to drive color monitors, or to printing ink arrangements such as cyan-magenta-yellow-black. Additional color spaces such as the CIE color spaces may also be used.

HLS and HVS are particularly advantageous as the human eye readily distinguishes differences along these three axes, and a programmer may readily match data to excursions along axes. Therefore, one may do mappings that associate the gross magnitude of motion energy to color hue (e.g., blue for low energy, ranging through color hues to red for high energy); associate the coherence or directionality of motion energy to lightness (e.g., random through radial through all in the same direction); and associate the number of different motion centers or objects or sources of coherence to saturation (e.g., very saturated for one source, very pastel for many). Obviously, any of these correspondences may be swapped for others, and other qualities be substituted. Qualities from other modalities (audio) or other meta data can be used.

Color bars can be used in conjunction with sounds, numbers, or text to further provide additional summary information to a client. Not all components of the color bars need to be used for representing motion information. A brightness component of a color bars 701 can be left unused or can provide information about audio associated with a particular video bit stream. For example, high brightness may indicate that the audio level associated with a particular frame is high. A frame with a high audio level and a high correlation to a radial expansion motion information template can have a high likelihood of showing an explosion.

Alarms can be used in conjunction with color bars to indicate that motion information has passed a particular threshold. For example, the motion information in a particular frame of home surveillance video may be highly correlated with a motion information template indicating that a burglar has entered the house. Video information monitoring and entryway can be used to identify motion information. The motion information is processed to determine magnitude, coherence, and correlation with various motion information templates. A high correlation with a particular motion information template may set off an alarm. For example, if the correlation is greater than 0.8 or less than −0.8, an alarm can be triggered. The threshold values can be altered to suit to a variety of purposes. For example, high correlation with a motion information template indicating burglary may set off an alarm if the correlation exceeds lower threshold values if the video frame is taken at night or when the house should be vacant.

Capture and Display of Audio Information

Figure 8:
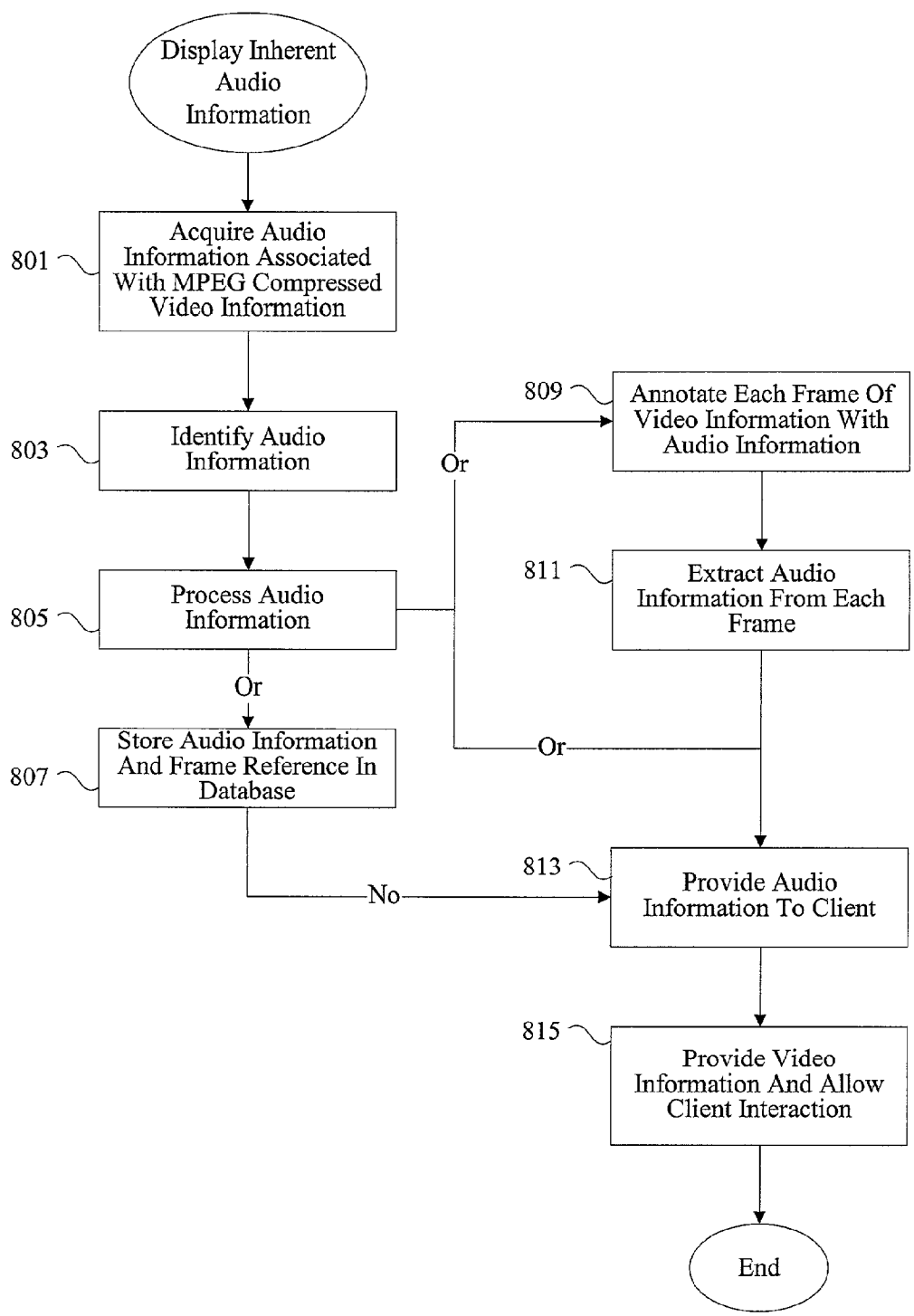
FIG. 8 is a process flow diagram showing another embodiment using the techniques of the present invention to provide audio information.

FIG. 8 is a process flow diagram showing another embodiment using the techniques of the present invention to provide audio information as indicated above. At 801, audio information associated with MPEG compressed video information is acquired. As will be appreciated by one of skill in the art, many formats including AC3 and Musicam may contain audio information. At 803, the audio information is identified. As noted above, the audio information may be contained in a separate bit stream. To locate audio information associated with a particular frame, synchronization information correlating the audio information with the video frames may be used. At 805, the audio information is processed. Processing audio information can include determining the frequency, amplitude, and phase of the audio information associated with a particular frame. The audio information can be associated with a frame reference and stored in the database at 807 or the audio information can be used to annotate each frame of video information at 809. If each frame is annotated with audio information, at 811, audio information is extracted from each frame. Alternatively the audio information after processing at 805 can be provided to a client at 813. At 815, video information is provided along with the audio information to allow client interaction. For example, the audio information can be provided using color bars as indicated in FIG. 7. The hue component of the color bars can be used to identify frequency information. Bright yellows can be used to identify high frequencies while deep blues can be used to identify low frequencies associated with a particular video frame. High amplitude audio components can be represented by high saturation components in the color bars.

Capture and Display of Scene Cut Information

Figure 9:
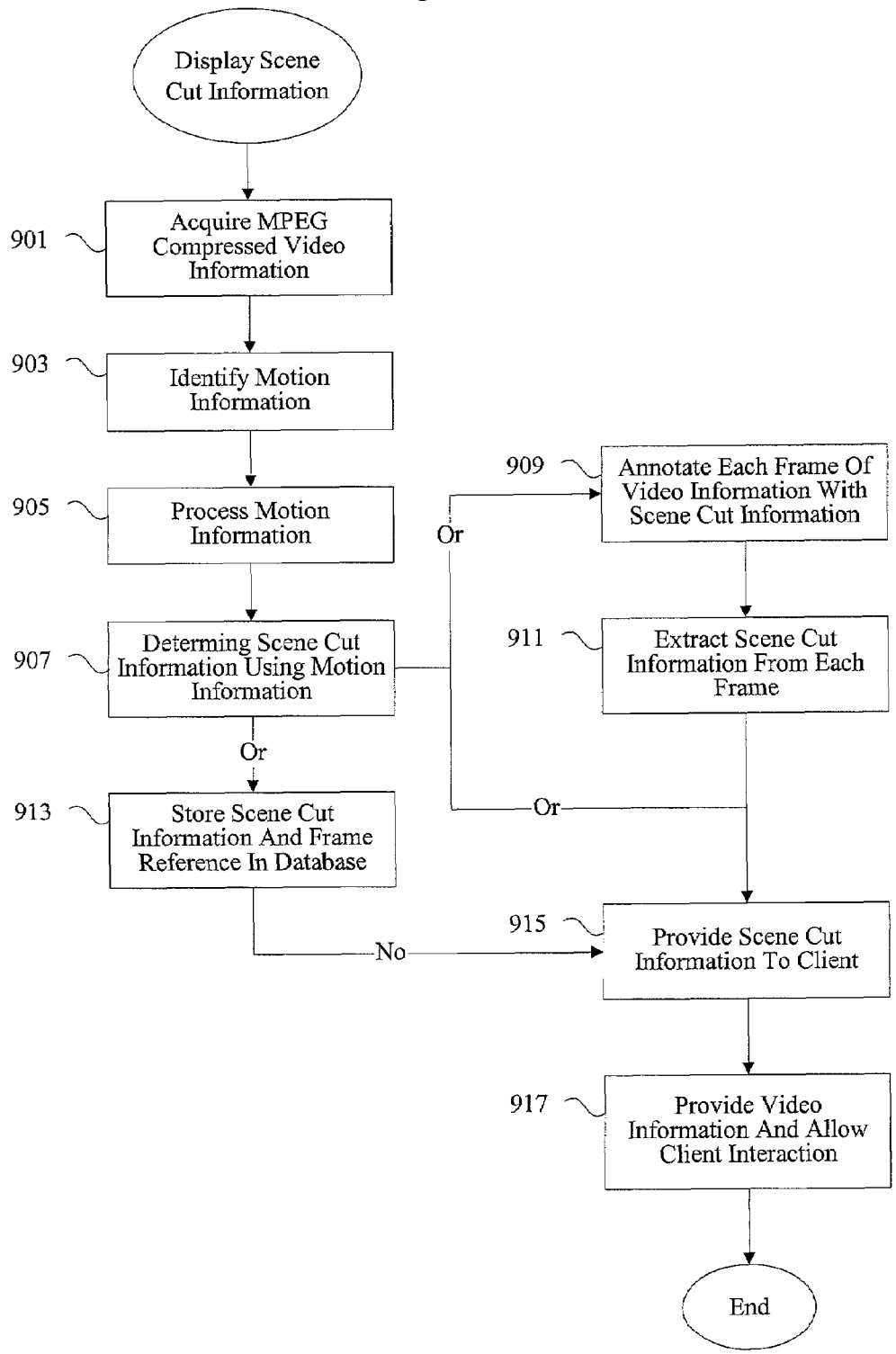
FIG. 9 is a process flow diagram showing another embodiment using the techniques of the present invention to provide scene cut information.

FIG. 9 is a process flow diagram that shows an embodiment using the techniques of the present invention to provide scene cut information. At 901, MPEG compressed video information is acquired. At 903, motion information is identified and processed at 905. Scene cut information can be determined using motion information at 907. Scene cut information can be determined by a using motion information that indicates that a current frame is substantially different from the prior frame. According to various embodiments, a scene cut frame is encoded as an image frame of I-frame because the differences between a scene cut frame and the prior frame are substantial. As will be appreciated by one of skill in the art, when the difference between a current frame any prior frame is substantial, the current frame is coded as an I-frame instead of as a differential P-frame or a B-frame. Alternatively the current frame could be encoded as a P-frame or a B-frame with substantial motion vector magnitude. The frames coded as I-frames or P-frames and B-frames with substantial motion vector magnitude can be flagged as likely scene cut frames. Scene cut frames can also be determined using timing information in conjunction with motion information. For example, if a scene cut occurred 30 seconds ago, it is likely that another scene cut will occur to signify the end of the commercial.

After scene cut information is acquired, the scene cut information can be stored with frame reference information in a database at 913, or it can be provided directly to a client at 915. Alternatively, scene cut information can be used to annotate each frame of video information at 909. The scene cut information can be extracted from each frame 911. The scene cut information is provided to the client at 915 along with video information at 917 to allow client interaction. According to various embodiments, the client can use scene cut information to navigate a video bit stream to locate a particular scene of interest. Scene cut information can be displayed using the color bars shown in FIG. 7, or scene cut information can be presented has audio or numerical data. For example, a scene cut can be indicated by a hue of red. An alarm can be used to indicate a scene cut from a commercial back to a program.

Capture and Display of Editorial Information

Figure 10:
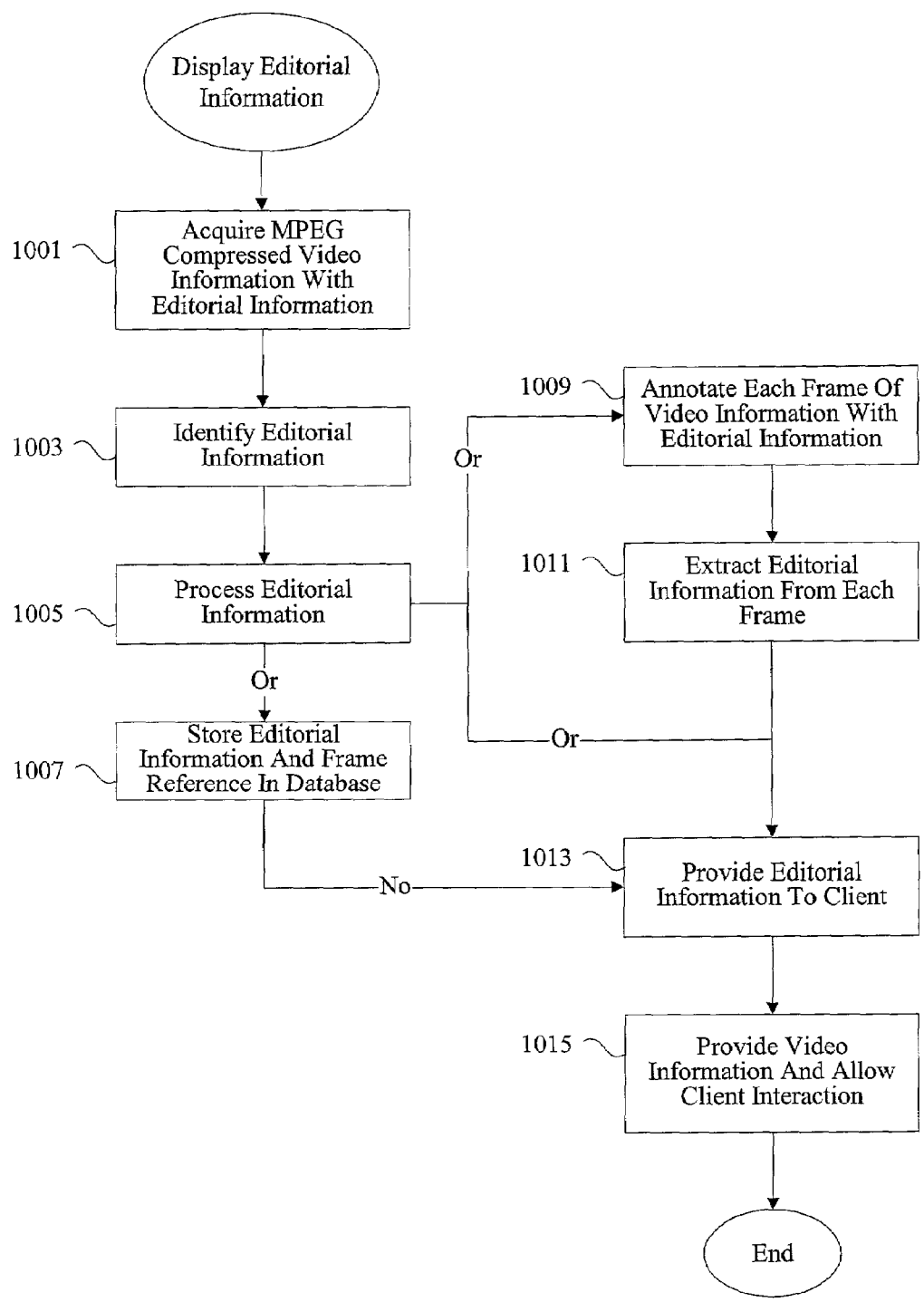
FIG. 10 is a process flow diagram showing another embodiment using the techniques of the present invention to provide editorial information.

FIG. 10 is a process flow diagram showing another embodiment using the techniques of the present invention to provide editorial information. At 1001, MPEG compressed video information that includes editorial information is acquired. At 1003, the editorial information is identified. The editorial information is then processed at 1005. For example, all the editorial information related to a program's parental guidance ratings may be extracted and provided to a client. In other words, only ratings such as PG, G, and R are processed from the MPEG compressed video information. The editorial information can be stored in a database at 1007, or the information can be used to annotate each frame the video information at 1009. The editorial information can be extracted from each video frame at 1011 and subsequently provided to the client at 1013. Alternatively the processed editorial information can be provided directly to the client at 1013. The editorial information is then provided along side video information to allow client interaction at 1015.

Interaction with Video Information Using Editorial Information

Figure 11:
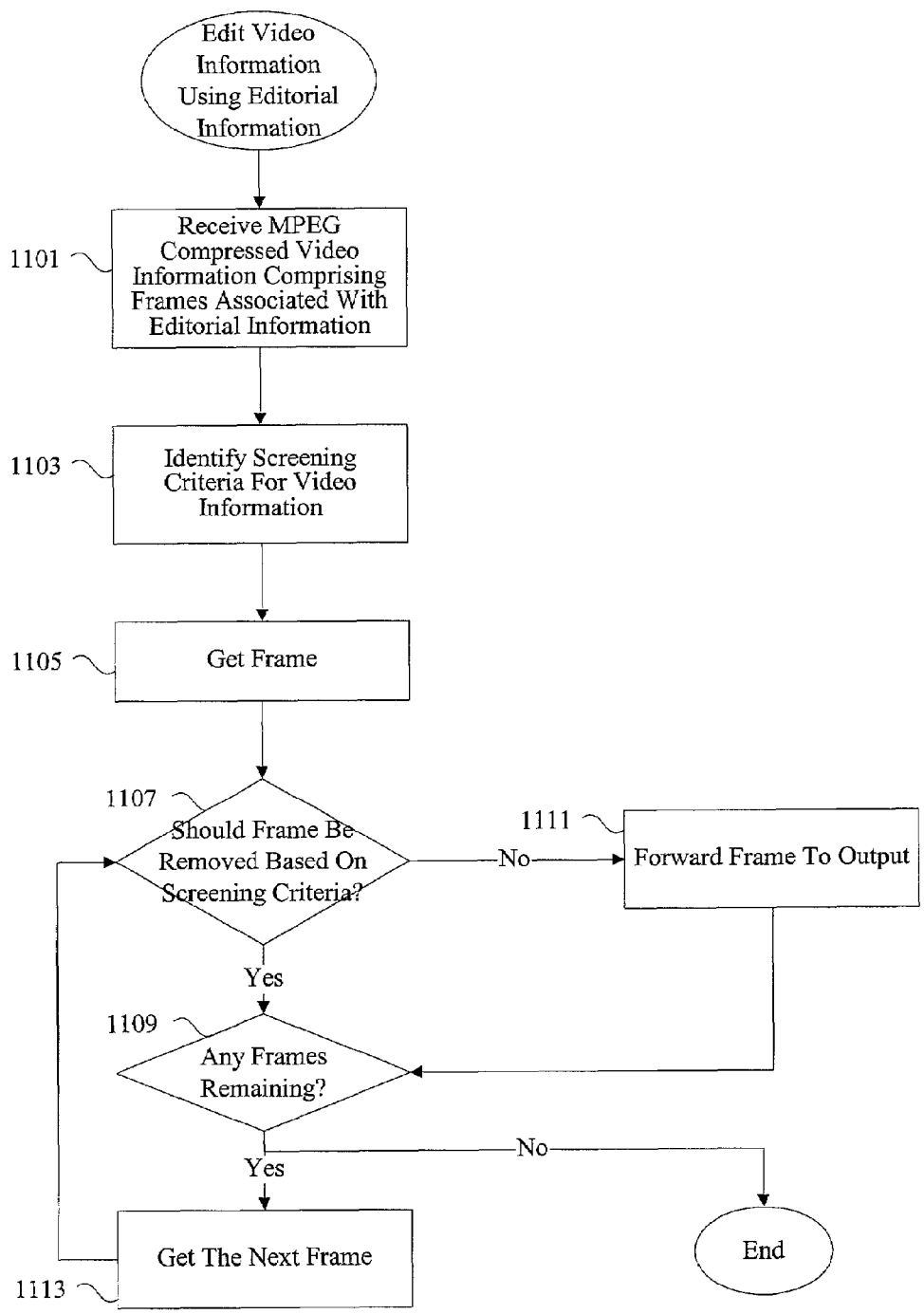
FIG. 11 is a process flow diagram showing techniques for editing video information using annotations.

FIG. 11 details one example of client interaction with video information using editorial information. At 1101, MPEG compressed video comprising frames associated with editorial information is received. Screening criteria for video information is identified at 1103. For example a client may specify that no R-rated frames be presented. An R-rated movie may contain many scenes of G-rated content and only a couple of scenes of R-rated content. A client may specify that during the viewing of the R-rated movie, the R-rated frames should be removed automatically. Alternatively, a client may specify that only scenes with violence be presented.

At 1105, a frame is acquired. At 1107, it is determined whether the frame should be removed based on the screening criteria. Using the example above, if a screen contains R-rated content, the frame is dropped and it is determined at 1109 whether any frames are remaining. If frames remain, at 1113 another frame is acquired. Alternatively if the frame should not be removed because it is not an R-rated frame, the frames are forwarded to output at 1111. Output can be a display device such as a monitor or a TV screen. After the frame is forwarded to output at 1111, it is determined at 1109 whether any frames remain. If any frames remain, the next frame is acquired to determine whether the frame should be screened.

Figure 12A:
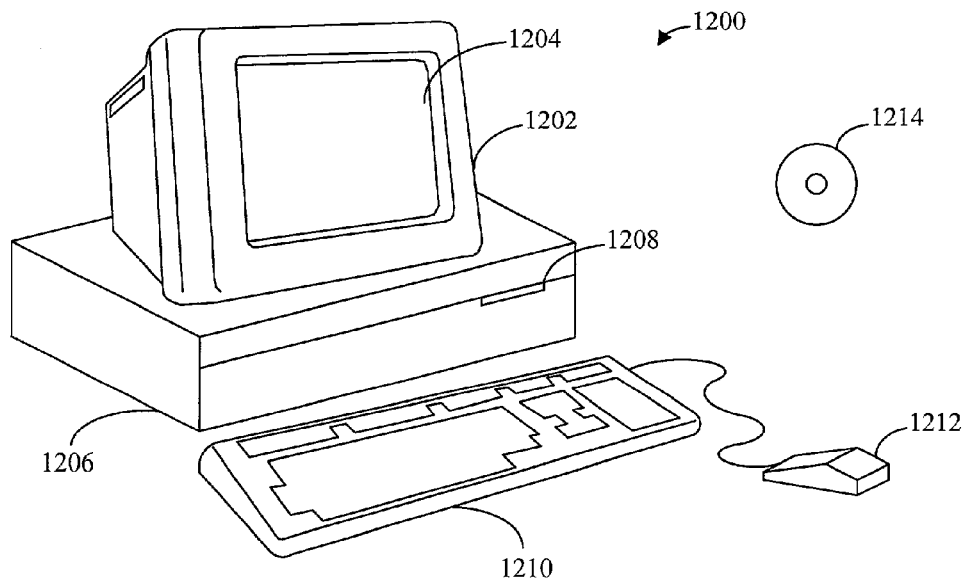
FIGS. 12A and 12B are diagrammatic representations of a general computer system that can implement the techniques of the present invention.
Figure 12B:
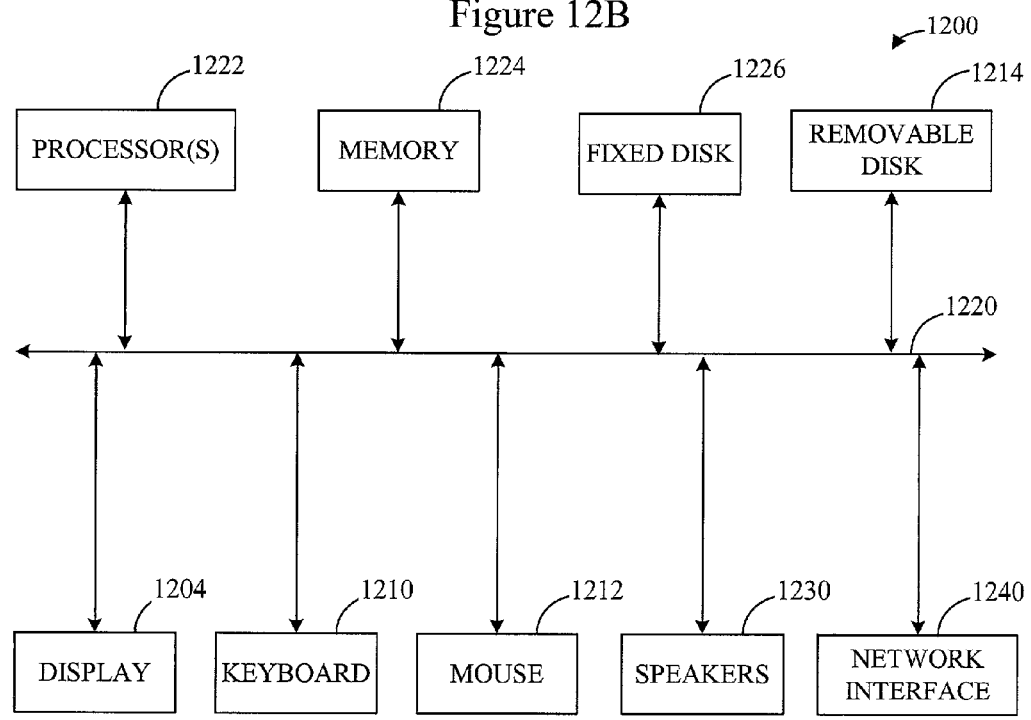

FIGS. 12A and 12B illustrate a computer system 1200 suitable for implementing embodiments of the present invention. FIG. 12A shows one possible physical form of the computer system. Of course, the computer system may have many physical forms ranging from an integrated circuit, a printed circuit board and a small handheld device up to a huge super computer. Computer system 1200 includes a monitor 1202, a display 1204, a housing 1206, a disk drive 1208, a keyboard 1210 and a mouse 1212. Disk 1214 is a computer-readable medium used to transfer data to and from computer system 1200.

FIG. 12B is an example of a block diagram for computer system 1200. Attached to system bus 1220 are a wide variety of subsystems. Processor(s) 1222 (also referred to as central processing units, or CPUs) are coupled to storage devices including memory 1224. Memory 1224 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 1226 is also coupled bi-directionally to CPU 1222; it provides additional data storage capacity and may also include any of the computer-readable media described below. Fixed disk 1226 may be used to store programs, data and the like and is typically a secondary storage medium (such as a hard disk) that is slower than primary storage. It will be appreciated that the information retained within fixed disk 1226, may, in appropriate cases, be incorporated in standard fashion as virtual memory in memory 1224. Removable disk 1214 may take the form of any of the computer-readable media described below.

CPU 1222 is also coupled to a variety of input/output devices such as display 1204, keyboard 1210, mouse 1212 and speakers 1230. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 1222 optionally may be coupled to another computer or telecommunications network using network interface 1240. With such a network interface, it is contemplated that the CPU might receive information from the network, or might output information to the network in the course of performing the above-described method steps. Furthermore, method embodiments of the present invention may execute solely upon CPU 1222 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher level code that are executed by a computer using an interpreter.

Although the foregoing invention has been described in some detail for purposes of clarity of understanding, it will be apparent that certain changes and modifications may be practiced within the scope of the appended claims. For instance, color bars for showing motion information may be displayed on one monitor while video information is simultaneously displayed on another monitor. Furthermore, color bars may be grayscale, and each component of the color bars need not be active for a video bit stream. Therefore, the described embodiments should be taken as illustrative and not restrictive, and the invention should not be limited to the details given herein but should be defined by the following claims and their full scope of equivalents.

What is claimed is:

1. A method for providing motion information from a compressed bit stream associated with video information to a client, the method comprising:
   identifying motion information associated with a compressed bit stream;
   processing motion information to generate processed motion information, including:
      determining motion information coherence by dividing a magnitude of averaged motion vectors by an average magnitude of motion vectors, wherein a motion vector indicates a direction of motion included with the video information; and
      determining motion information magnitude based at least in part on the average magnitude of motion vectors;
   providing the processed motion information to the client, wherein providing the processed motion information allows the client to identify a location of interest in the bit stream based at least in part on one or more of the motion information coherence and the motion information magnitude; and
   receiving from the client a selection indicating the location of interest in the bit stream.

2. The method of claim 1, wherein the compressed bit stream is an MPEG compressed bit stream.

3. The method of claim 1, wherein the processed motion information is provided to the client using color bars.

4. The method of claim 1, wherein the processed motion information is represented using hue, brightness, and saturation.

5. The method of claim 1, wherein the processed motion information is represented using an alarm.

6. The method of claim 1, processing motion information comprises comparing motion information in the bit stream with a motion information template.

7. The method of claim 6, wherein comparing motion information comprises determining correlation between the motion information in the bit stream and the motion information template.

8. The method of claim 1, further comprising identifying scene cut information using the processed motion information.

9. The method of claim 8, further comprising providing the scene cut information to the client.

10. The method of claim 1, further comprising identifying audio information from the compressed bit stream.

11. The method of claim 10, further comprising providing the audio information to the client.

12. The method of claim 1, further comprising identifying editorial information from the compressed bit stream.

13. The method of claim 12, further comprising providing the editorial information to the client.

14. A method for providing motion information from a bit stream associated with video information to a client, the method comprising:
   receiving an MPEG-compressed video bit stream representing a series of images; processing motion vectors of said MPEG-compressed video bit stream to produce motion information concerning said series images, including:
      determining motion information coherence by dividing a magnitude of averaged motion vectors by an average magnitude of motion vectors, wherein a motion vector indicates a direction of motion included with the video information; and
      determining motion information magnitude based at least in part on the average magnitude of motion vectors;
   displaying said motion information to a client in a graphical user interface whereby said client is able to identify a location of interest in the bit stream based at least in part on one or more of the motion information coherence and the motion information magnitude; and
   receiving from the client a selection indicating the location of interest in the bit stream.

15. The method of claim 14, wherein the motion information is provided to the client using color bars.

16. The method of claim 14, wherein the motion information is represented using hue, brightness, and saturation.

17. The method of claim 14, processing motion vectors comprises comparing motion information in the bit stream with a motion information template.

18. The method of claim 17, wherein comparing motion information comprises determining correlation between the motion information in the bit stream and the motion information template.

19. A method for providing supplemental information from a MPEG bit stream associated with video information to a client, the method comprising:
   identifying supplemental information associated with an MPEG bit stream; processing supplemental information to generate processed supplemental information, including:
      determining motion information coherence by dividing a magnitude of averaged motion vectors by an average magnitude of motion vectors, wherein a motion vector indicates a direction of motion included with the video information; and
      determining motion information magnitude based at least in part on the average magnitude of motion vectors;
   providing the processed supplemental information to the client, wherein providing the processed supplemental information allows the client to identify a location of interest in the bit stream based at least in part on one or more of the motion information coherence and the motion information magnitude; and
   receiving from the client a selection indicating the location of interest in the bit stream.

20. The method of claim 19, wherein the processed supplemental information is provided to the client using color bars.

21. The method of claim 19, wherein the processed supplemental information is represented using hue, brightness, and saturation.

22. The method of claim 19, wherein the processed supplemental information is represented using an alarm.

23. The method of claim 19, wherein the processed supplemental information is processed motion information.

24. The method of claim 19, wherein the processed supplemental information is processed audio information.

25. The method of claim 19, wherein the processed supplemental information is processed scene cut information.

26. The method of claim 19, wherein the processed supplemental information is processed editorial information.

27. An apparatus for providing motion information from a MPEG bit stream associated with video information to a client, the apparatus comprising:
   means for identifying motion information associated with an MPEG bit stream;
   means for processing motion information to generate processed motion information, including:
      determining motion information coherence by dividing a magnitude of averaged motion vectors by an average magnitude of motion vectors, wherein a motion vector indicates a direction of motion included with the video information; and
      determining motion information magnitude based at least in part on the average magnitude of motion vectors;
   means for providing the processed motion information to the client, wherein providing the processed motion information allows the client to identify a location of interest in the bit stream based at least in part on one or more of the motion information coherence and the motion information magnitude; and
   means for receiving from the client a selection indicating the location of interest in the bit stream.

28. The apparatus of claim 27, wherein the processed motion information is provided to the client using color bars.

29. The apparatus of claim 27, wherein the processed motion information is represented using hue, brightness and saturation.

30. A computer program product comprising a computer readable medium on which is provided program instructions for providing motion information from a MPEG bit stream associated with video information to a client, the computer readable medium comprising:
   computer code for identifying motion information associated with an MPEG bit stream; computer code for processing motion information to generate processed motion information, including:
      determining motion information coherence by dividing a magnitude of averaged motion vectors by an average magnitude of motion vectors, wherein a motion vector indicates a direction of motion included with the video information; and
      determining motion information magnitude based at least in part on the average magnitude of motion vectors;
   computer code for providing the processed motion information to the client, wherein providing the processed motion information allows the client to identify a location of interest in the bit stream based at least in part on one or more of the motion information coherence and the motion information magnitude; and
   computer code for receiving from the client a selection indicating the location of interest in the bit stream.

31. The computer program product of claim 30, wherein the processed motion information is provided to the client using color bars.

32. The computer program product of claim 30, wherein the processed motion information is represented using hue, brightness, and saturation.

33. An apparatus for providing motion information from a MPEG bit stream associated with video information to a client, the apparatus comprising:
   an input interface configured to receive an MPEG bit stream;
   memory coupled with the input interface;
   a processor coupled with memory, wherein the processor is configured to identify motion information associated with an MPEG bit stream and process motion information to generate processed motion information, including:
      determining motion information coherence by dividing a magnitude of averaged motion vectors by an average magnitude of motion vectors, wherein a motion vector indicates a direction of motion included with the video information; and
      determining motion information magnitude based at least in part on the average magnitude of motion vectors;
   an output interface coupled with the processor, the output interface configured to provide the processed motion information to the client, wherein providing the processed motion information allows the client to identify a location of interest in the bit stream based at least in part on one or more of the motion information coherence and the motion information magnitude; and an input interface coupled with the processor, the input interface configured to receive from the client a selection indicating the location of interest in the bit stream.

34. The apparatus of claim 33, wherein the processed motion information is provided to the client using color bars.

35. The apparatus of claim 33, wherein the processed motion information is represented using hue, brightness, and saturation.

36. The apparatus of claim 33, wherein the processed motion information is represented using an alarm.

37. The apparatus of claim 33, further comprising storing the motion information in a database.

38. The apparatus of claim 33, processing motion information comprises comparing motion information in the bit stream with a motion information template.

39. The apparatus of claim 38, wherein comparing motion information comprises determining correlation between the motion information in the bit stream and the motion information template.

40. The apparatus of claim 33, further comprising identifying scene cut information using the processed motion information.

41. The apparatus of claim 40, further comprising providing the scene cut information to the client.

42. The apparatus of claim 33, further comprising identifying audio information from the MPEG compressed bit stream.

43. The apparatus of claim 42, further comprising providing the audio information to the client.

44. The apparatus of claim 33, further comprising identifying editorial information from the MPEG compressed bit stream.

45. The apparatus of claim 44, further comprising providing the editorial information to the client.

* * * * *

UNITED STATES PATENT AND TRADEMARK OFFICE
CERTIFICATE OF CORRECTION

PATENT NO. : 7,266,771 B1 Page 1 of 1
APPLICATION NO. : 09/841687
DATED : September 4, 2007
INVENTOR(S) : Tow et al.

It is certified that error appears in the above-identified patent and that said Letters Patent is hereby corrected as shown below:

In column 13, line 27, after "by" delete "a".

Signed and Sealed this

Second Day of September, 2008

JON W. DUDAS
*Director of the United States Patent and Trademark Office*